(12) United States Patent
Waywood

(10) Patent No.: US 6,946,193 B1
(45) Date of Patent: Sep. 20, 2005

(54) BIAXIALLY ORIENTED POLYOLEFIN SLIP FILMS WITH IMPROVED FLATNESS AND ADHESION PROPERTIES

(75) Inventor: William John Waywood, Terre Haute, IN (US)

(73) Assignee: Applied Extrusion Technologies, Inc., New Castle, DE (US)

( * ) Notice: Subject to any disclaimer, the term of this patent is extended or adjusted under 35 U.S.C. 154(b) by 45 days.

(21) Appl. No.: 09/916,053

(22) Filed: Jul. 26, 2001

(51) Int. Cl.$^7$ ................................................. B32B 3/26
(52) U.S. Cl. ...................... 428/354; 428/343; 428/346; 428/516; 428/910
(58) Field of Search ................................. 428/354, 346, 428/343, 516, 910

(56) References Cited

U.S. PATENT DOCUMENTS

| | | | | |
|---|---|---|---|---|
| 5,264,277 A | * | 11/1993 | Frognet et al. | 428/315.5 |
| 6,150,013 A | * | 11/2000 | Balaji | 428/220 |
| 6,322,883 B1 | * | 11/2001 | Williams | 428/308.4 |

FOREIGN PATENT DOCUMENTS

| | | |
|---|---|---|
| WO | WO 97 30841 A1 | 8/1997 |
| WO | WO 00 32396 A1 | 6/2000 |
| WO | WO 00 46288 A1 | 8/2000 |
| WO | WO 01 46274 A1 | 6/2001 |

OTHER PUBLICATIONS

EP Search Report from corresponding International Application No. PCT/US02/12818, mailed Aug. 2, 2002.

* cited by examiner

*Primary Examiner*—Daniel Zirker
(74) *Attorney, Agent, or Firm*—Caesar, Rivise, Bernstein, Cohen & Pokotilow, Ltd.

(57) ABSTRACT

A biaxially oriented multilayer film usable to form adhesive labels to be attached to containers, such as bottles and cans. The film includes a core layer comprising polypropylene and a migratory slip agent and an outer slip layer on one side of the core layer. The slip layer includes primarily polypropylene, by weight, and a minor percent, by weight, of an additive, with the additive and the migratory amide being present in amounts to provide a COF on the surface of the slip layer of no greater than 0.45 and to provide an adhesion of the adhesive employed on the formed label for the slip layer of at least 50%.

45 Claims, No Drawings

BIAXIALLY ORIENTED POLYOLEFIN SLIP FILMS WITH IMPROVED FLATNESS AND ADHESION PROPERTIES

FIELD OF THE INVENTION

This invention relates generally to polyolefin films; more particularly to biaxially oriented polyolefin films, preferably polypropylene films, having a desired flatness to minimize processing problems during printing and/or laminating, desired slip properties to render the films machinable in labeling apparatus and desired adhesion properties to adhere to adhesives, particularly hot melt adhesives, employed in labeling applications.

BACKGROUND ART

Biaxially oriented polypropylene films have been employed in the roll fed label and packaging industries. One of the key product attributes that must be possessed by these films is a sufficiently low coefficient of friction (COF) to allow the film to easily slide on various machine surfaces, thus resulting in efficient processing of the films.

In addition, a second key attribute is that the surface having desired slip properties must also have sufficient adhesion properties to effectively adhere to adhesives employed in label applications.

Since the COF of polypropylene film is generally higher than that desired for effective processing in labeling applications, various additives have been incorporated into the film to reduce the COF. Two common additives employed to reduce COF are organosilicone particulate materials, such as Tospearl T120, which is supplied by G.E. Toshiba Sales Americas in Waterford, N.Y., and fatty acid amides.

When using an organosilicone particulate material such as Tospearl, the particles are typically included in a thin, coextruded surface layer of a multi-layer film. The particles tend to reduce the degree of contact between the polypropylene film and machine surface engaging the skin layer, and generally act like ball bearings to reduce the drag of the film on the machine surfaces. While this technology works well in reducing the degree of contact between the film and the machine surfaces, as well as lowering the measured COF, the resulting film surface has a roughness, or uneven contour, that has been shown to have a negative impact in certain labeling applications.

As noted above, fatty acid amides also have been employed as slip agents to reduce COF. These amides generally are compounded with the polyolefin polymer and are thus contained within the matrix of the polymer throughout the orientation process of the film. Since the polyolefin polymer and amide are generally chemically incompatible, over time the amide will migrate to the film's surface, thereby providing desired slip properties to the film. However, due to other steric, thermodynamic and practical considerations, the diffusion process often needs to be accelerated through the use of heat. Although heating the film does provide for a faster and more effective migration of the amide to the film surface, thereby lowering the COF, the exposure of the film to elevated temperatures often causes non-uniform shrinkage of the film. This can have an adverse affect on the desired flatness of the sheet, thereby creating problems during printing and or laminating processes. Moreover, excessive migration of the fatty acid amides to the surface of the film may adversely affect the adhesion properties of the film surface. This can present problems in utilizing the film in labeling applications.

Although coextruded polyolefin films have included an antistatic additive in an outer skin layer and a migratory amide in the core layer, to the best of applicant's knowledge these additives have not been employed for the purposes of reducing the COF of the skin layer against metal machine surfaces, such as metal surfaces in labeling machines, and of providing desired adhesion properties to adhesives employed in labels. Applicant is not aware of any prior art films in which the types and amounts of an antistatic additive in the outer skin and a migratory amide in the core achieve the desired COF and adhesion properties desired for adhesive label applications, as in the present invention.

In view of the state of the art, a need exists in the labeling art for a biaxially oriented polyolefin film having a desired flatness to reduce, or minimize, problems during printing and/or laminating in the manufacture of labels, desired slip properties to render the film machinable without the use of particulate materials, such as organosilicone particulate materials, in the surface layer to reduce COF, and also without the need for heating the film to enhance the rate of migration of a fatty acid amide from the core to the surface of the film for providing the desired COF, and with the desired "adhesion" (hereinafter defined) to adhesives employed in label applications, such as to hot melt adhesives. It is to such an improved multilayer polyolefin film that the present invention is directed.

SUMMARY OF THE INVENTION

The above and other objects of this invention are achieved in a biaxially oriented, multilayer, polyolefin film including a core layer and at least one outer skin layer. The skin layer preferably is adhered to the core layer and has desired slip properties and adhesion properties in accordance with this invention. The outer skin layer preferably includes a blend that is predominately polypropylene homopolymer, by weight, with a minor weight percent of an additive that results in the films of this invention having the desired slip and adhesion properties as specified in greater detail hereinafter. In the most preferred embodiments of this invention the additive includes an antistatic agent that preferably includes an ethoxylated alkyamine and/or an ethoxylated alkyamide, possibly either chemically reacted with or physically blended with an ester, e.g., glycerol monostearate, sorbitol based esters, etc. Most preferably, the antistatic agent includes an ethoxylated alkyamine that may be either chemically reacted with or physically blended with an ester.

The core layer is predominantly a polypropylene homopolymer, by weight, including a minor percent by weight of the core layer of a migratory amide. The additive in the skin layer, preferably including an antistatic agent, and the migratory amide in the core layer are present in amounts that provide a film/metal COF of less than 0.45 and preferably less that 0.35, and an adhesion of at least 50% to hot melt adhesives usable in the products of this invention; more preferably an adhesion of at least 70%; even more preferably an adhesion of at least 90% and most preferably an adhesion in excess of 90%. In order to achieve these COF and adhesion properties the additive in the skin layer needs to be of a type that provides the desired slip properties without undesirably affecting adhesion properties and needs to be present in an amount to preclude the migratory amide in the core from migrating to the surface of the skin layer in an amount that impairs the adhesion properties at that surface. Similarly, the migratory amide needs to be of a type and amount that does not preclude the additive in the skin layer from providing its desired slip and adhesion properties.

In a preferred embodiment of this invention, the additive in the skin layer is an antistatic agent that is included in a particulate masterbatch based on homopolymer polypropylene, with the polypropylene being about 87–88% of the masterbatch and the antistatic agent being about 12–13% of the masterbatch. The preferred masterbatch is POLYBATCH ASPA 2485, manufactured by A. Schulman, Inc., of Akron, Ohio. The weight percent of the POLYBATCH ASPA 2485 masterbatch employed in the skin layer preferably is at least 4% by weight of said skin layer; more preferably in excess of 4% and even more preferably about 8% or even more. Thus, the weight percent of the antistatic agent in the skin layer preferably is at least about 0.48%, more preferably in excess of 0.48% and even more preferably in the range of 0.96% to 1.04%, or even more.

In a preferred embodiment of this invention the migratory amide is behenamide and preferably is present in the core in an amount greater than 0.10% by weight of the core layer and more preferably about 0.25% or more. In a preferred embodiment of this invention, the migratory amide is a behenamide of the type supplied as Kemamide B by Witco, based in Greenwich Conn., and is included in the commercially available polypropylene homopolymer, Aristech FFO38A2.

In accordance with the preferred embodiments of this invention, the adhesives employed in the labels are hot melt adhesives having varying levels of aggressiveness. In this invention, these hot melt adhesives have a desired level of adhesion to the surface of the outer skin layer including the antistatic agent therein even if the film is exposed to adverse environmental conditions, e.g., as a result of being stored and/or transported in a hot environment for long periods of time. Under these adverse conditions the surface of prior art films including behenamide in both the core and in the outer skin layer of a multilayer structure, or in a single monolayer structure, will not retain its desired adhesion properties. As noted earlier, the adhesion of the hot melt adhesives in accordance with this invention is at least 50%; more preferably at least 70%; even more preferably at least 90% and most preferably in excess of 90%.

In accordance with the preferred embodiment of this invention, the film surface including the antistatic agent therein is free of any oxidative treatment, such as corona or flame treatment. It has been found that the corona treatment of the film surface including the additive therein tends to decrease the adhesion of the hot melt adhesive to the surface layer, resulting in poor, or reduced label performance. The reason for this phenomena is not clearly understood. However, in some products within the scope of this invention the film surface including the additive therein may be oxidatively treated.

DESCRIPTION OF THE PREFERRED EMBODIMENT OF THE INVENTION

When reference is made herein to "polypropylene" it is intended to mean a crystalline propylene homopolymer or a copolymer of propylene with another olefin having from 2 to 5 carbon atoms in an amount insufficient to have a significant affect on the crystallinity of the polypropylene. Typically this is ethylene in an amount up to about 2% by weight. The polypropylene employed in this invention preferably is the homopolymer.

Most preferably the polypropylenes employed in this invention are Ziegler-Natta catalyzed and are commercially available isotactic polypropylenes having a melt-flow rate between about 2 and 10 gm/10 min at 230° C. and 2.16 Kg. load and a DSC melting point of about 160 to 166° C. Suitable polypropylene homopolymers are available from numerous sources, such as Sunoco of Philadelphia, Pa., Basell, which is located in the Netherlands, Exxon Chemical Company of Baytown, Tex., and Fina Oil and Chemical Company of Deerpark, Tex. The specific polypropylene employed in this invention is not considered a limitation on the broadest aspects of this invention. For example, and not by way of limitation, the polypropylene can be metallocene catalyzed, or a blend of Ziegler-Natta catalyzed and metallocene catalyzed polypropylene.

In a preferred embodiment of this invention, the polyolefin film is a multilayer, biaxially oriented polypropylene film having a central core and at least one outer skin layer, and preferably opposed outer skin layers. Preferably the central core is the thickest component of the multilayer film and is sufficiently thick to be self-sustaining or supporting, without the inclusion of one or more outer skin layers.

In a representative, non-limiting embodiment of this invention, the film has a thickness of 48 gauge, with the core layer being 42 gauge and opposed outer skin layers each being 3 gauge. At least one of the outer skin layers includes a desired low COF in accordance with this invention.

In accordance with the broadest aspects of this invention, the multilayer film includes at least two layers; a thick core layer and a thin outer skin layer having the desired low, metal/film COF slip properties in accordance with this invention. For ease of description, this outer skin layer will sometimes be referred to as the "slip layers" or "outer slip layer." Moreover, reference throughout this application to "coefficient of friction" or "COF" refers to a metal/film coefficient of friction determined in a manner to be described hereinafter.

Most preferably the multilayer film includes at least three (3) layers. In particular, for printed label applications, a coextruded three (3) layer film is clear, or transparent, and includes the slip layer and core layer, as described above, and, in addition, an outer, lower skin layer in the form of a printable or bondable layer, which is on the side of the core layer opposed to the slip layer.

In printed labels employing the clear or transparent three layer structure described in the immediately preceding paragraph, the lower skin layer generally is laminated through a suitable adhesive to another single layer or multilayer film, which can be either clear or opaque. The construction and/or use of this latter single layer or multilayer film does not constitute a limitation on the broadest aspects of this invention.

If the coextruded clear film of this invention is printed on the lower skin layer, a reverse printing process is employed so that the printed indicia will be readable through the upper surface of the slip layer, and the adhesive employed to laminate the upper layer of the additional film to the reverse printed label surface is compatible with the ink and the surfaces joined by the adhesive.

If the coextruded clear film of this invention is not printed on the lower skin layer, a direct printing process is employed to include printed indicia on the upper surface of the additional film, which is the surface that is laminated to the lower skin layer through a suitable adhesive. Therefore whether the lower skin layer is reverse printed, or the upper surface of the additional film is direct printed, the printing is in the interior of the label stock, and therefore is protected.

Moreover, in order to highlight, or enhance the visibility of the printed indicia, whether indirect or direct, the additional film laminated to the mulilayer film of this invention preferably is a single layer or multilayer opaque film; thereby providing a white background for the printed material. However, if it desired to actually view the color or appearance of an edible product or beverage retained within a clear bottle or can, then the printed label employed on that bottle or can needs to be transparent. Therefore, the additional film laminated to the lower skin layer of a transparent film of this invention also needs to be transparent, whether or not the additional film is a single layer or multilayer film.

In the completed label construction, which includes both a clear or transparent multilayer film of this invention and an additional film laminated to the multilayer film to protect the printed indicia on the label, an adhesive is applied to the lower, exposed surface of the additional film for use in attaching the label to a container, such as a bottle or can. Preferably, the adhesive is included on vertical edges of the label and most preferably is applied adjacent each vertical edge in the form of a narrow adhesive stripe, as is well known in the art.

In the most preferred embodiment of this invention, one of the vertical adhesive stripes on the label is adhered directly to the container, and the label is then wrapped about the container with the other vertical adhesive stripe overlapping and adhesively bonded to the edge of the outer slip layer of the label in a region overlying said first vertical adhesive stripe that directly adheres the lower surface of the label to the container. In this most preferred embodiment, it is extremely important that the vertical adhesive stripe secured to the slip layer provides effective adherence to prevent the label from separating in the overlapped, bonded region. Thus, the slip layer of the film of this invention, in addition to having a desired low coefficient of friction to permit the film to be handled in commercial labeling equipment, must be capable of effectively adhering the overlapping lower surface of the label thereto through the stripe of adhesive employed for that purpose.

In accordance with this invention, the slip layer of the multilayer film has a metal/film COF of less than 0.45 and more preferably less than 0.35, as determined by a modified form of ASTM D1894. Specifically, in the standard ASTM procedure a piece of film is placed on both the sled and stainless steel platform, and the COF that is determined is a film/film COF. In accordance with this invention, the film of this invention is placed only on the sled, and the COF is determined between the slip layer of this film and the stainless steel platform of the test apparatus, employing all of the other steps specified in ASTM D1894.

Most preferably, the adhesives employed in the labels of this invention are hot melt adhesives, which may have various levels of aggressiveness. In accordance with this invention, the slip layers need to permit "adhesion" of the hot melt adhesives at a level of at least 50%; more preferably at least 70%; even more preferably at least 90% and most preferably in excess of 90%.

The test employed to determine "adhesion" for the hot melt adhesives to the slip layers of the films of this invention is as follows:

A Krones labeling machine is employed to adhere a label to a metal can with a hot melt type of adhesive. Krones, Inc., the supplier of Krones packaging equipment in the United States, is located at 9600 South 58$^{th}$ Street, Franklin, Wis. The adhesive is applied as a stripe to the inside, or lower, surface of the label (that which will contact the can) at the recommended application temperatures using the standard operating procedures for the labeler. The amount of glue applied corresponds to a setting of 1.5 on the glue application wheel of the Krones labeling machine. Visually, this corresponds to a point where the entire length (i.e., vertical height) of the label (5–7/8 inches, in this case) is covered with adhesive, but less than the point where excess adhesive is squeezed from the overlap seal that is formed between the upper slip layer of the film of this invention and the insider, or lower, surface of the label. The labeler is run at an operating speed of 120 labels per minute (LPM).

In accordance with one test procedure, the label is an adhesive lamination of an outer film in accordance with this invention to a printed, voided, opaque, inner film. Both are multi-layer, coextruded, oriented polypropylene films. The structure of the inner film can be varied; however, it is important that the hot melt adhesive that is employed be firmly adhered to the lower surface of the inner film in a manner that will not permit the hot melt adhesive to separate from this lower surface during the peel test for "adhesion." In other words, the peel test is for the purpose of determining the adhesion of the adhesive to the slip layer, and therefore the adhesive can not separate from the lower surface of the inner film prior to separating from the slip layer or prior to the film failing in some other manner, as described hereinafter.

After reaching steady-state conditions, the labeler is run at the conditions described above and labels are applied to new, clean metal cans. As the can exits the machine, it is removed and the adhesion evaluated in the manner described hereinafter. As noted above, the adhesion being investigated is the overlap seal of the adhesive to the slip layer of the film of this invention.

An attempt is made to peel the overlap seal apart by lifting the outer, overlapping edge of the label by hand along the length, or vertical dimension, of the can. If the adhesion of the hot melt adhesive to the surface of the slip layer is 100%, then the overlap seal will remain intact and the label will tear or destruct at some other interface. If the adhesion of the hot melt adhesive to the surface of the slip layer is 0%, then the hot melt adhesive will peel cleanly away from the surface of the slip layer. If the pattern of adhesion is intermittent, with portions of the adhesive remaining adhered to the slip layer and other portions peeling apart cleanly, then the percentage of adhesion is the fraction of the total length of portions of the overlapping edges of the label that remain adhered, as evidenced by the length of portions of the overlapping edges that tear or destruct at an interface other than the adhesive-slip layer interface, to the total length of the overlap seal, reported as a percentage.

It is desirable to have a degree of adhesion as close to 100% as possible. However, as noted above, adhesion of at least 50% is deemed acceptable with the hot melt adhesives utilized in this invention. More preferably the level of adhesion is at least 70%; even more preferably at least 90% and most preferably in excess of 90%. If the adhesion level falls below 50%, then the degree of adhesion should be considered a failure.

It should be noted that the test for adhesion generally is carried out within one (1) minute of removal of the can from the labeler, and the percentage of adhesion reported for the multilayer films of this invention relate to the adhesion determined in this manner. If the time is extended, then the degree of adhesion generally increases. However, due to the chemical nature of certain hot melt adhesives, the mode of failure can be cohesive (through the thickness of the hot melt itself). This can tend to cloud the adhesion results. In these latter cases, it has been determined that the period of time between production and evaluation of the seal must be altered to a point that is significantly greater than 1 minute. The exact time is dependant upon the specific hot melt adhesive being used and is that time that prevents cohesive failure.

In a preferred embodiment of this invention, the outer slip layer is a blend of a polypropylene homopolymer and an a minor weight percent of an additive that results in the films of this invention having the desired slip and adhesion properties specified earlier herein. In the most preferred embodiments of this invention the additive includes an antistatic agent that preferably includes an ethoxylated alkyamine and/or an ethoxylated alkyamide, possibly either chemically reacted with or physically blended with an ester, e.g., glycerol monostearate, a sorbitol based ester, etc. In the most preferred embodiment of this invention, the additive is an antistatic agent including an ethoxylated alkyamine and is included in a particulate, or pelletized, masterbatch that is predominantly polypropylene homopolymer, by weight, with a minor percentage, by weight, of the ethoxylated alkyamine. In a representative embodiment the additive is a blend including 87–88% by weight polypropylene homopolymer and 12–13% by weight of the ethoxylated alkyamine that possibly is either physically blended with or chemically reacted with an ester.

Although the preferred embodiment of this invention employs the aforementioned antistatic agent as the preferred additive in the slip layer for achieving the desired slip and adhesion properties, the use of other types of additives is within the broadest aspects of this invention; provided that the additives, in conjunction with the other components of the film provide the desired slip and adhesion properties specified earlier in this application. The present invention will hereinafter be described in connection with the preferred embodiment including an antistatic agent as the desired additive to the slip layer.

Applicant has determined that in order to obtain the desired slip effect, or low metal/film COF, on the outer surface of the slip layer in accordance with this invention, the core layer needs to include a migratory amide therein. In a preferred embodiment, the migratory amid is behenamide, which is supplied as Kemamide B by Witco, based in Greenwich, Conn. However, other migratory amides are believed to be usable in this invention to achieve the desired COF within the scope of this invention.

As noted earlier, in the most preferred embodiment of this invention the antistatic agent is included in a particulate, or pelletized masterbatch and this masterbatch is present in the slip layer in a range of at least 4% by weight of said skin layer; more preferably in excess of 4% and even more preferably about 8% or even more. Therefore, the antistatic agent in the slip layer is present in the range of at least about 0.48% by weight based upon the total weight of the polymeric slip layer; more preferably in excess of 0.48%; more preferably in the range of about 0.96% to 1.04%, or even more. Although greater weight percentages of the antistatic agent can be employed, applicant has not perceived any desired benefit of improved, lower coefficient of friction by employing, for example, 12% by weight of the particulate masterbatch, i.e., 1.44% by weight of the antistatic agent. Thus, although higher percentages of the antistatic agent can be employed, there is no practical reason for utilizing such higher percentages.

As noted earlier herein, in accordance with the preferred aspects of this invention the antistatic additive is an ethoxylated alkyamine and/or an ethoxylated alkyamide; most preferably an ethoxylated alkyamine. The ethoxylated alkyamine and/or the ethoxylated alkyamide may either be physically blended with or possibly reacted with an ester, e.g., glycerol monostearate, a sorbitol based ester, etc.

In the most preferred embodiments of this invention, the antistatic additive is included in a masterbatch identified as POLYBATCH ASPA 2485, which is supplied as a pelletized concentrate by A. Schulman, Inc. of Akron, Ohio. POLYBATCH ASPA 2485 is an ethoxylated alkyamine that either is blended with or chemically reacted with an ester. The POLYBATCH ASPA 2485 is a masterbatch including 87–88% polypropylene homopolymer and 12–13% of the ethoxylated alkyamine.

As noted earlier herein, Applicant has determined that in order to obtain the desired slip effect, or low COF, on the outer surface of the slip layer, the core layer needs to include a migratory amide therein. In accordance with a preferred embodiment of this invention, application has found that the core layer preferably is a polypropylene homopolymer containing at least 0.1% of the migratory amide, such as behenamide, and more preferably a migratory amide in the range of about 0.2–0.3%, based on the total weight of the core layer. In the most preferable embodiment, the behenamide is present in an amount of about 0.25% of the total weight of the core layer. Although higher percentages of behenamide may be usable there does not appear to be any reason for using such higher percentages.

Although some reduction in coefficient of friction was observed when the percentage of behenamide was as low as 0.1% by weight of the total weight of the core layer, more desirable coefficients of friction were achieved with the level of behenamide being at 0.25%.

Interestingly, it has been determined that Croda EBS, which is an ethylene bisstearamide, when employed in the core layer at levels of 0.25% and 0.50% of the total weight of the core layer, did not provide the same desired reduction in coefficient of friction as behenamide, which is classified as a primary amide.

Applicant has determined that increasing the level of the POLYBATCH ASPA 2485 antistatic formulation in the skin from 8% to 12% by weight, based upon the total weight of the skin layer, did not have a significant impact on the film COF or performance of the film on labeling machines. On the other hand, lowering the level of the POLYBATCH ASPA 2485 to 4% by weight of the total weight of the slip layer, although not providing a significant adverse affect on the coefficient of friction of the slip layer, did reduce the operating window on Krones labeling equipment. That is, when 4% by weight of the POLYBATCH ASPA 2485 was employed in the slip layer closer control over the vacuum level employed on the cutting drum and over the position of the cutting knife needed to be achieved in order to provide effective operation of the labeling equipment.

In accordance with this invention, the slip layer is capable of receiving hot melt adhesives having various levels of aggressiveness with a desired level of adhesion, thereby making the films highly desirable for use in adhesive label applications. Such hot melt adhesives are available from H. B. Fuller Company of St. Paul, Minn. as well as from other sources.

When Fuller CLARITY HL-4157 hot melt adhesive was applied to films containing behenamide both in the core and on the film surface (i.e., prior art films) there was a low level of adhesion near 0% immediately after application of the adhesive. However, with a coextruded, biaxially oriented polypropylene film having an outer slip layer containing 8% of the POLYBATCH ASPA 2485 in accordance with this invention, the behenamide in the core was effectively blocked from the surface of the outer slip layer and the level of adhesion increased from approximately 0% in the prior art film to 70%–98%.

When the film was heated at 55° C. for twenty-four (24) hours prior to the application of the Fuller CLARITY HL-4157 hot melt adhesive (to accelerate migration of the fatty acid amide to the surface), the level of adhesion of the film without the outer slip layer of the present invention remained poor, at approximately 0%, while the modified film in accordance with the present invention had high levels of adhesion in the range of 60%–98%. With other Fuller hot melt adhesives having more aggressiveness than Fuller CLARITY HL-4157, i.e., Fuller CLARITY HL-4164 and Fuller CLARITY HL-4165, adhesion levels of the "amide only" prior art film went from 70%–75%, without heating, to 0%–5% after heating at the above-stated conditions (i.e., at 55° C. for twenty-four (24) hours). However, with these latter adhesives the modified films in accordance with the present invention displayed adhesion levels of 98% to 100% regardless of the thermal history of the film.

Quite surprisingly, applicant determined that oxidatively treating the outer slip layer of the films of the present invention, such as by corona treatment, actually reduces the level of adhesion of the hot melt adhesive to the surface of the slip layer. This was somewhat surprising in view of the fact that corona treatment most commonly is employed to improve the adhesion characteristics of a surface layer of a film to both printing inks and adhesives. Thus, in accordance with the most preferred embodiments of the present invention the outer slip layer is free of any oxidative treatment, although it is believed that for some applications an oxidative treatment of the outer slip layer will not adversely effect performance of the product. Therefore, the oxidative treatment of the outer slip layer of the films of this invention is within the scope of the broadest aspects of the invention.

EXAMPLE 1

A coextruded, multilayer, biaxially oriented polyolefin film in accordance with this invention is a 48-gauge thick, biaxially oriented polypropylene film having a 3-gauge outer slip layer with the antistatic agent therein, a 42-gauge thick core layer adhered to the slip layer and a 3-gauge thick skin layer on the surface of the core opposite that of the slip layer and being receptive to printing and/or bonding applications. In this exemplary embodiment, the slip layer included 92% polypropylene homopolymer (Aristech FFO35C) combined with 8% of the A. Schulman POLYBATCH ASPA 2485 concentrate. The core layer is a polypropylene homopolymer (Aristech FFO38A2) containing 0.25% behenamide (Kemamide B). The print layer opposite the slip layer is a isotactic polypropylene homopolymer containing 0.25% Tospearl T120 and 0.15% Sylobloc 45, and is sold under the brand name Aristech FFO35W. The Tospearl included in the print layer functions both as a slip and anti-block agent, whereas the Sylobloc 45 functions predominately as an anti-block agent.

All of the polymers employed in this invention are polypropylene homopolymers containing 0.068% sodium benzoate nucleator and 0.25% Irganox B225 stabilizer. The inclusion of the sodium benzoate nucleator aids in maintaining the crystallinity of the polypropylene, thereby providing improved optical and strength properties in the films of this invention.

It should be noted that the POLYBATCH ASPA 2485 is advertised by A. Schulman, Inc., as being usable to control dust and optimize antistatic properties. There is no recognition in any of the product literature known to applicant that this additive can or will function in any way to improve the slip properties of a film, let alone that it should or could be employed as in the present invention.

In accordance with this invention, the POLYBATCH ASPA 2485 including the antistatic agent therein, in a minor amount, is blended with polypropylene homopolymer to form an outer skin layer, and the migration of the antistatic agent out of the skin layer is believed to be precluded, or at least minimized, by the presence of a migratory amide in the core. At the same time, the composition of the slip layer precludes the migratory amide in the core from migrating to the surface of the slip layer in an amount that adversely affects the ability of the slip layer to receive hot melt adhesives with the desired degree of adhesion to the film. Moreover, because of the construction of the films of this invention, the films do not need to be heated to achieve migration of the slip agent to the film surface. Thus, the possible adverse affect on the flatness of the film resulting from heating of the film is avoided. Moreover, if the films of this invention are exposed to hot environments, e.g., during storage or shipment, the adhesion properties of the slip layer for the hot melt adhesives commonly employed in label applications in accordance with this invention will not be adversely affected.

The above examples are given by way of illustration only, and the invention should only be limited in accordance with the terms of the appended claims. It should be understood that the present invention can be employed to form a wide range of multilayer films of varying thickness and employing alternate polymer types and a variety of different additives. The specific types of additives which can be employed can be determined by routine experiment carried out by individuals skilled in the art.

Without further elaboration, the foregoing will so fully illustrate my invention that others may, by applying current or future knowledge, readily adopt the same for use under various conditions of service.

What I claim as my invention is the following:

1. A biaxially oriented multilayer film usable to form adhesive labels to be attached to containers, such as bottles and cans, said film including a core layer comprising polypropylene and a migratory slip agent in the form of a migratory amide and an outer slip layer on one side of the core layer, said slip layer including primarily polypropylene, by weight, and a minor percent, by weight, of an antistatic agent, said antistatic agent being present in a sufficient amount to preclude the migratory amide in the core layer from migrating to the surface of the skin layer in an amount that reduces the adhesion of the adhesive employed on the formed label for the slip layer to less than 50%, said antistatic agent and said amide being present in amounts to provide a COF on the surface of the slip layer of no greater than 0.45 and to provide an adhesion of the adhesive employed on the formed label for the slip layer of at least 50%.

2. The biaxially oriented multilayer film of claim 1, wherein the amide is behenamide.

3. The biaxially oriented multilayer film of claim 1, wherein said migratory amide is present in a percentage, by weight, of at least 0.10%, based upon the weight of the core layer.

4. The biaxially oriented multilayer film of claim 3, wherein the percentage, by weight, of the migratory amide is about 0.25% or greater based upon the weight of the core layer.

5. The biaxially oriented multilayer film of claim 3, wherein the percentage, by weight, of the migratory amide is in the range of abut 0.2–0.3% based upon the weight of the core layer.

6. The biaxially oriented multilayer film of claim 1, wherein the antistatic agent includes an ethoxylated alkyamine and/or an ethoxylated alkyamide.

7. The biaxially oriented multilayer film of claim 6, wherein the antistatic agent includes an ethoxylated alkyamine.

8. The biaxially oriented multilayer film of claim 6, wherein said ethoxylated alkyamine and/or ethoxylated alkyamide is either physically blended with or chemically reacted with an ester.

9. The biaxially oriented multilayer film of claim 7, wherein said ethoxylated alkyamine is either physically blended with or chemically reacted with an ester.

10. The biaxially oriented multilayer film of claim 1, wherein said multilayer film includes an additional outer layer on the side of the core layer opposite said slip layer, said additional outer layer having a surface for receiving printed indicia thereon and/or being bondable to a surface of an additional film employed to form labels.

11. The biaxially oriented multilayer film of claim 1, wherein said outer slip layer is free of any oxidative treatment.

12. The biaxially oriented multilayer film of claim 6, wherein said outer slip layer is free of any oxidative treatment.

13. The biaxially multilayer film of claim 7, wherein said outer slip layer is free of any oxidative treatment.

14. The biaxially oriented multilayer film of claim 1, wherein the antistatic agent is present in a sufficient amount to preclude the migratory amide in the core layer from migrating to the surface of the skin layer in an amount that reduces the adhesion to less than 70%, said adhesion being at least 70%.

15. The biaxially oriented multilayer film of claim 1, wherein the antistatic agent is present in a sufficient amount to preclude the migratory amide in the core layer from migrating to the surface of the skin layer in an amount that reduces the adhesion to less than 90%, said adhesion being at least 90%.

16. The biaxially oriented multilayer film of claim 1, wherein the adhesive employed on the formed label is a hot melt adhesive.

17. The biaxially oriented multilayer film of claim 16, wherein the antistatic agent is present in a sufficient amount to preclude the migratory amide in the core layer from migrating to the surface of the skin layer in an amount that reduces the adhesion to less than 70%, said adhesion being at least 70%.

18. The biaxially oriented multilayer film of claim 16, wherein the antistatic agent is present in a sufficient amount to preclude the migratory amide in the core layer from migrating to the surface of the skin layer in an amount that reduces the adhesion to less than 90%, said adhesion being at lest 90%.

19. The biaxially oriented multilayer film of claim 1, wherein the COF is no greater than 0.35.

20. The biaxially oriented multilayer film of claim 14, wherein the COF is no greater than 0.35.

21. The biaxially oriented multilayer film of claim 15, wherein the COF is no greater than 0.35.

22. The biaxially oriented multilayer film of claim 16, wherein the COF is no greater than 0.35.

23. The biaxially oriented multilayer film of claim 17, wherein the COF is no greater than 0.35.

24. The biaxially oriented multilayer film of claim 18, wherein the COF is no greater than 0.35.

25. A biaxially oriented multilayer label to be attached to containers, such as bottles and cans, said label including a core layer comprising polypropylene and a migratory slip agent in the form of a migratory amide, an outer slip layer on one side of the core layer, said slip layer including primarily polypropylene, by weight, and a minor percent, by weight, of an antistatic agent, an inner layer on the side of the core layer opposite the outer slip layer, and an additional film having an inner surface adhered to an outer surface of the inner layer and an opposed, outer surface including an adhesive thereon, printed indicia on the outer surface of the inner layer or on the inner surface of the additional film, one end of said outer surface of said additional film being attachable to a container surface through the adhesive thereon and an opposed end of said outer surface of said additional film overlapping and being adhesively attachable to an outer surface of the slip layer when the label is attached to a container, said antistatic agent being present in a sufficient amount to preclude the migratory amide in the core layer from migrating to the surface of the skin layer in an amount that reduces the adhesion of the adhesive employed on the formed label for the slip layer to less than 50%, said antistatic agent and said migratory amide being present in amounts to provide a COF on the surface of the slip layer of no greater than 0.45 and to provide an adhesion of the adhesive for the slip layer of at least 50%.

26. The biaxially oriented multilayer label of claim 25, wherein the amide is behenamide.

27. The biaxially oriented multilayer label of claim 25, wherein said migratory amide is presented in a percentage, by weight, of at least 0.10%, based upon the weight of the core layer.

28. The biaxially oriented multilayer label of claim 27, wherein the percentage, by weight, of the migratory amide is about 0.25% or greater based upon the weight of the core layer.

29. The biaxially oriented multilayer label of claim 27, wherein the percentage, by weight, of the migratory amide is in the range of about 0.2–0.3% based upon the weight of the core layer.

30. The biaxially oriented multilayer of claim 25, wherein the antistatic agent includes an ethoxylated alkyamine and/or an ethoxylated alkyamide.

31. The biaxially oriented multilayer label of claim 30, wherein the antistatic agent includes an ethoxylated alkyamine.

32. The biaxially oriented multilayer label of claim 30, wherein said ethoxylated alkyamine and/or ethoxylated alkyamide is either physically blended with or chemically reacted with an ester.

33. The biaxially oriented multilayer label of claim 31, wherein said ethoxylated alkyamine is either physically blended with or chemically reacted with an ester.

34. The biaxially oriented multilayer label of claim 32, wherein said outer slip layer is free of any oxidative treatment.

35. The biaxially oriented multilayer film of claim 32, wherein the antistatic agent is present in a sufficient amount to preclude the migratory amide in the core layer from migrating to the surface of the skin layer in an amount that reduces the adhesion to less than 70%, said adhesion being at least 70%.

36. The biaxially oriented multilayer film of claim 25, wherein the antistatic agent is present in a sufficient amount to preclude the migrator amide in the core layer from migrating to the surface of the skin layer in an amount that reduces the adhesion to less than 90%, said adhesion being at least 90%.

37. The biaxially oriented multilayer label of claim 25, wherein the adhesive is a hot melt adhesive.

38. The biaxially oriented multilayer label of claim 37, wherein the antistatic agent is present in a sufficient amount to preclude the migratory amide in the core layer from migrating to the surface of the skin layer in an amount that reduces the adhesion to less than 70%, said adhesion being at least 70%.

39. The biaxially oriented multilayer label of claim 37, wherein the antistatic agent is present in a sufficient amount to preclude the migratory amide in the core from migrating to the surface of the skin layer in an amount that reduces the adhesion to less than 90%, said adhesion being at least 90%.

40. The biaxially oriented multilayer label of claim 25, wherein the COF is no greater than 0.35.

41. The biaxially oriented multilayer label of claim 35, wherein the COF is no greater than 0.35.

42. The biaxially oriented multilayer label of claim 36, wherein the COF is no greater than 0.35.

43. The biaxially oriented multilayer label of claim 37, wherein the COF is no greater than 0.35.

44. The biaxially oriented multilayer label of claim 38, wherein the COF is no greater than 0.35.

45. The biaxially oriented multilayer label of claim 39, wherein the COF is no greater than 0.35.

* * * * *